United States Patent
Zhang et al.

(10) Patent No.: US 12,254,828 B2
(45) Date of Patent: Mar. 18, 2025

(54) METHOD FOR CONTROLLING DYNAMIC CHANGE OF SCREEN REFRESH RATE AND ELECTRONIC DEVICE

(71) Applicant: HONOR DEVICE CO., LTD., Shenzhen (CN)

(72) Inventors: Kai Zhang, Shenzhen (CN); Jian Zhou, Shenzhen (CN); Shijin Li, Shenzhen (CN); Lifeng Cai, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/275,305

(22) PCT Filed: Dec. 22, 2022

(86) PCT No.: PCT/CN2022/141110
§ 371 (c)(1),
(2) Date: Aug. 1, 2023

(87) PCT Pub. No.: WO2023/160194
PCT Pub. Date: Aug. 31, 2023

(65) Prior Publication Data
US 2024/0185775 A1   Jun. 6, 2024

(30) Foreign Application Priority Data
Feb. 28, 2022   (CN) .......................... 202210191454.6

(51) Int. Cl.
*G09G 3/3208*   (2016.01)
*G06F 3/14*   (2006.01)
(Continued)

(52) U.S. Cl.
CPC ............. *G09G 3/3208* (2013.01); *G06F 3/14* (2013.01); *G06F 3/147* (2013.01); *G09G 5/18* (2013.01);
(Continued)

(58) Field of Classification Search
CPC ......... G06F 3/14; G06F 3/147; G09G 3/2096; G09G 3/3208; G09G 5/18; G09G 5/393;
(Continued)

(56) References Cited

U.S. PATENT DOCUMENTS 9,905,199 B2   2/2018   Liu et al.
11,887,557 B2   1/2024   Wang et al.
(Continued)

FOREIGN PATENT DOCUMENTS

CN   105427785 A   3/2016
CN   110333834 A   10/2019
(Continued)

*Primary Examiner* — Adam J Snyder
(74) *Attorney, Agent, or Firm* — WOMBLE BOND DICKINSON (US) LLP

(57) ABSTRACT

A method for controlling dynamic change of a screen refresh rate and an electronic device are provided. In a scenario of dynamic change of the refresh rate, a refresh rate switching instruction may be sent immediately through an added refresh rate setting interface (displaySetFps) within a current $i^{th}$ frame period before a current Vsync periodicity ends. After receiving the refresh rate switching instruction, a DDIC drives a display screen to switch a screen refresh rate, and then the DDIC returns a new TE signal. After receiving the new TE signal, SurfaceFlinger starts a new Vsync periodicity corresponding to a switched screen refresh rate. In an embodiment of this application, a switching speed at which the screen refresh rate is switched may be increased (Continued)

by adding a new path. For example, it may be ensured that each switching of the screen refresh rate is completed within one frame.

18 Claims, 9 Drawing Sheets

(51) Int. Cl.
  *G06F 3/147* (2006.01)
  *G09G 5/18* (2006.01)
  *G09G 3/20* (2006.01)
  *G09G 5/393* (2006.01)

(52) U.S. Cl.
  CPC .......... *G09G 3/2096* (2013.01); *G09G 5/393* (2013.01); *G09G 2320/103* (2013.01); *G09G 2330/021* (2013.01); *G09G 2330/023* (2013.01); *G09G 2340/0435* (2013.01)

(58) Field of Classification Search
  CPC ....... G09G 2320/103; G09G 2330/021; G09G 2330/023; G09G 2340/0435
  See application file for complete search history.

(56) References Cited

U.S. PATENT DOCUMENTS

| | | | |
|---|---|---|---|
| 2018/0261143 A1 | 9/2018 | Peng et al. | |
| 2021/0065658 A1 | 3/2021 | Ji et al. | |
| 2022/0351679 A1 | 11/2022 | Yang et al. | |
| 2022/0358894 A1 | 11/2022 | Wang et al. | |
| 2023/0040656 A1 | 2/2023 | Wai et al. | |
| 2023/0282162 A1 | 9/2023 | Gao et al. | |

FOREIGN PATENT DOCUMENTS

| | | |
|---|---|---|
| CN | 110503708 A | 11/2019 |
| CN | 111613173 A | 9/2020 |
| CN | 111968582 A | 11/2020 |
| CN | 112331145 A | 2/2021 |
| CN | 112511716 A | 3/2021 |
| CN | 112667340 A | 4/2021 |
| CN | 113140173 A | 7/2021 |
| CN | 113160747 A | 7/2021 |
| CN | 113160748 A | 7/2021 |
| CN | 113362783 A | 9/2021 |
| CN | 113608713 A | 11/2021 |
| CN | 113630572 A | 11/2021 |
| CN | 113781949 A | 12/2021 |
| CN | 114040238 A | 2/2022 |
| CN | 114648951 A | 6/2022 |
| EP | 4068256 A1 | 10/2022 |
| WO | 2021143458 A1 | 7/2021 |
| WO | 2021143676 A1 | 7/2021 |
| WO | 2021153955 A1 | 8/2021 |
| WO | 2021175213 A1 | 9/2021 |

METHOD FOR CONTROLLING DYNAMIC CHANGE OF SCREEN REFRESH RATE AND ELECTRONIC DEVICE

CROSS-REFERENCE TO RELATED APPLICATIONS

This application is a national stage of International Application No. PCT/CN2022/141110, filed on Dec. 22, 2022, which claims priority to Chinese Patent Application No. 202210191454.6, filed on Feb. 28, 2022. The disclosures of both of the aforementioned applications are hereby incorporated by reference in their entireties.

TECHNICAL FIELD

This application relates to the field of display technologies, and in particular to a method for controlling dynamic change of a screen refresh rate and an electronic device.

BACKGROUND

With the continuous development of display screen technologies, an increasing number of display screens that can support display with a high refresh rate emerge. During running of an application with a high frame rate or during a sliding operation, the display screen is set to a high refresh rate mode, to increase smoothness of an image.

However, because human eyes are sensitive to moving objects, a relatively high screen refresh rate is required in various dynamic display scenarios. When an electronic device senses appearance of a dynamic display scenario, a current screen refresh rate may be switched to the relatively high screen refresh rate, to satisfy a high frame rate display demand of the dynamic display scenario. In this case, if there is a long delay during switching of the screen refresh rate, a tearing effect caused by dislocation of a screen image occurs, and a user also feels image freezing.

SUMMARY

This application provides a method for controlling dynamic change of a screen refresh rate and an electronic device, and resolves a problem, in conventional technologies, that image tearing and image freezing occur on a screen due to a relatively long delay during switching of a screen refresh rate, when the screen refresh rate dynamically changes.

To achieve the foregoing objective, the following technical solutions are used in this application.

According to a first aspect, this application provides a method for controlling dynamic change of a screen refresh rate. The method is applied to an electronic device. The electronic device includes a display screen and a display driver integrated circuit DDIC. The method includes:
 recognizing, in response to a first operation by a user, that a current scenario category changes to a first scenario category, where the first scenario category is a static display scenario or a dynamic display scenario;
 generating a screen refresh rate switching instruction based on a scenario recognition result, where the screen refresh rate switching instruction is for instructing the display screen to switch from a current first screen refresh rate to a second screen refresh rate, and the second screen refresh rate is a screen refresh rate corresponding to the first scenario category;
 sending the screen refresh rate switching instruction to the DDIC within a current frame period, to instruct the DDIC to switch to the second screen refresh rate; and
 switching an image sending and displaying periodicity from a first Vsync periodicity to a second Vsync periodicity after the DDIC is switched to the second screen refresh rate, where the first Vsync periodicity corresponds to the first screen refresh rate, and the second Vsync periodicity corresponds to the second screen refresh rate.

In the solution provided in this application, in a scenario of dynamic change of the refresh rate, the refresh rate switching instruction may be sent immediately (for example, sent through an added refresh rate setting interface) within a current $i^{th}$ frame period before a current Vsync periodicity ends. After receiving the refresh rate switching instruction, the DDIC drives the display screen (such as an OLED) to switch the screen refresh rate, and then the DDIC returns a new TE signal. After receiving the new TE signal, SurfaceFlinger starts a new Vsync periodicity corresponding to a switched screen refresh rate. In an embodiment of this application, a switching speed at which the screen refresh rate is switched may be increased by adding a new path. For example, it may be ensured that each switching of the screen refresh rate is completed within one frame. This reduces a delay and prevents image freezing to some extent.

In some possible implementations, the electronic device further includes a refresh rate setting interface. The method further includes: invoking the refresh rate setting interface within the current frame period, to send the screen refresh rate switching instruction.

In some possible implementations, the method further includes: The DDIC controls the display screen to perform refresh and display at the second screen refresh rate based on the screen refresh rate switching instruction.

In some possible implementations, after the DDIC is switched to the second screen refresh rate, the method further includes: The DDIC generates a TE signal, where the TE signal indicates that the image sending and displaying periodicity is switched to the second Vsync period.

In some possible implementations, the electronic device further includes SurfaceFlinger. After the DDIC generates a TE signal, the method further includes: The DDIC reports the TE signal to the SurfaceFlinger.

In some possible implementations, the switching an image sending and displaying periodicity from a first Vsync periodicity to a second Vsync periodicity includes: The SurfaceFlinger switches the image sending and displaying periodicity from the first Vsync periodicity to the second Vsync period.

In some possible implementations, that the SurfaceFlinger switches the image sending and displaying periodicity from the first Vsync periodicity to the second Vsync periodicity includes: The SurfaceFlinger switches the image sending and displaying periodicity from the first Vsync periodicity to the second Vsync periodicity based on the TE signal.

In some possible implementations, after the switching an image sending and displaying periodicity from a first Vsync periodicity to a second Vsync period, the method further includes: The SurfaceFlinger sends and displays an image based on the second Vsync periodicity.

In some possible implementations, before the generating a screen refresh rate switching instruction based on a scenario recognition result, the method further includes: The SurfaceFlinger sends and displays an image based on the first Vsync periodicity.

In some possible implementations, the electronic device further includes a driver display and a hardware composer HWC. That the DDIC reports the TE signal to the SurfaceFlinger includes: The DDIC reports the TE signal to the driver display; the driver display reports the TE signal to the HWC; and the HWC reports the TE signal to the SurfaceFlinger.

In some possible implementations, the electronic device further includes a refresh rate decision making module. The invoking the refresh rate setting interface within the current frame period, to send the screen refresh rate switching instruction to the DDIC includes: The refresh rate decision making module invokes the refresh rate setting interface within the current frame period, to send the screen refresh rate switching instruction to the DDIC.

In some possible implementations, that the refresh rate decision making module invokes the refresh rate setting interface within the current frame period, to send the screen refresh rate switching instruction to the DDIC includes: The refresh rate decision making module invokes the refresh rate setting interface within the current frame period, to send the screen refresh rate switching instruction to a display driver; and the display driver sends the screen refresh rate switching instruction to the DDIC.

In some possible implementations, the generating a screen refresh rate switching instruction based on a scenario recognition result includes: The refresh rate decision making module generates the screen refresh rate switching instruction based on the scenario recognition result.

In some possible implementations, the generating a screen refresh rate switching instruction based on a scenario recognition result includes: generating the screen refresh rate switching instruction when the scenario recognition result indicates that a current scenario changes to the static display scenario, where the switched second screen refresh rate is lower than the current first screen refresh rate; or generating the screen refresh rate switching instruction when the scenario recognition result indicates that a current scenario changes to the dynamic display scenario, where the switched second screen refresh rate is higher than the current first screen refresh rate.

In some possible implementations, the method further includes: determining the second Vsync periodicity based on the second screen refresh rate.

In some possible implementations, the determining the second Vsync periodicity based on the second screen refresh rate includes: determining the second Vsync periodicity as 1,000/R milliseconds when the second screen refresh rate is R Hz.

In some possible implementations, the second screen refresh rate is any one of the following: 1 Hz, 10 Hz, 30 Hz, 40 Hz, 60 Hz, 90 Hz, or 120 Hz.

In some possible implementations, the display screen is an organic light-emitting diode OLED display screen.

According to a second aspect, this application provides an apparatus for controlling dynamic change of a screen refresh rate. The apparatus includes a unit for performing the method in the first aspect. The apparatus may correspondingly perform the method described in the first aspect. For related descriptions of the units in the apparatus, reference is made to the descriptions in the first aspect. For brevity, the details are not described herein again.

The method described in the first aspect may be implemented by hardware, or may be implemented by hardware executing corresponding software. The hardware or the software includes one or more modules or units corresponding to the foregoing functions, for example, a processing module or unit and a display module or unit.

According to a third aspect, this application provides an electronic device. The electronic device includes a processor. The processor is coupled to a memory. The memory is configured to store a computer program or instructions. The processor is configured to execute the computer program or the instructions stored in the memory, to enable the method in the first aspect to be performed.

For example, the processor is configured to execute the computer program or the instructions stored in the memory, to enable the apparatus to perform the method in the first aspect.

Optionally, the processor is a display driver integrated circuit DDIC. The DDIC is used in a display screen. The DDIC is configured to execute a computer program or instructions stored in the memory, to perform the method in the first aspect.

According to a fourth aspect, this application provides a computer-readable storage medium. The computer-readable storage medium stores a computer program (which may also be referred to as instructions or code) used for implementing the method in the first aspect.

For example, when the computer program is executed by a computer, the computer is enabled to perform the method in the first aspect.

According to a fifth aspect, this application provides a chip, including a processor. The processor is configured to read and execute a computer program stored in a memory, to perform the method in the first aspect and any possible implementation of the first aspect.

Optionally, the chip further includes the memory, and the memory is connected to the processor through a circuit or a wire.

According to a sixth aspect, this application provides a chip system, including a processor. The processor is configured to read and execute a computer program stored in a memory, to perform the method in the first aspect and any possible implementation of the first aspect.

Optionally, the chip system further includes the memory, and the memory is connected to the processor by using a circuit or an electric wire.

According to a seventh aspect, this application provides a computer program product. The computer program product includes a computer program (also referred to as instructions or code). When the computer program is executed by an electronic device, the electronic device is enabled to implement the method in the first aspect.

It may be understood that, for beneficial effects of the foregoing second aspect to seventh aspect, reference may be made to related descriptions in the foregoing first aspect. The details are not described herein again.

DESCRIPTION OF EMBODIMENTS

Figure 1:
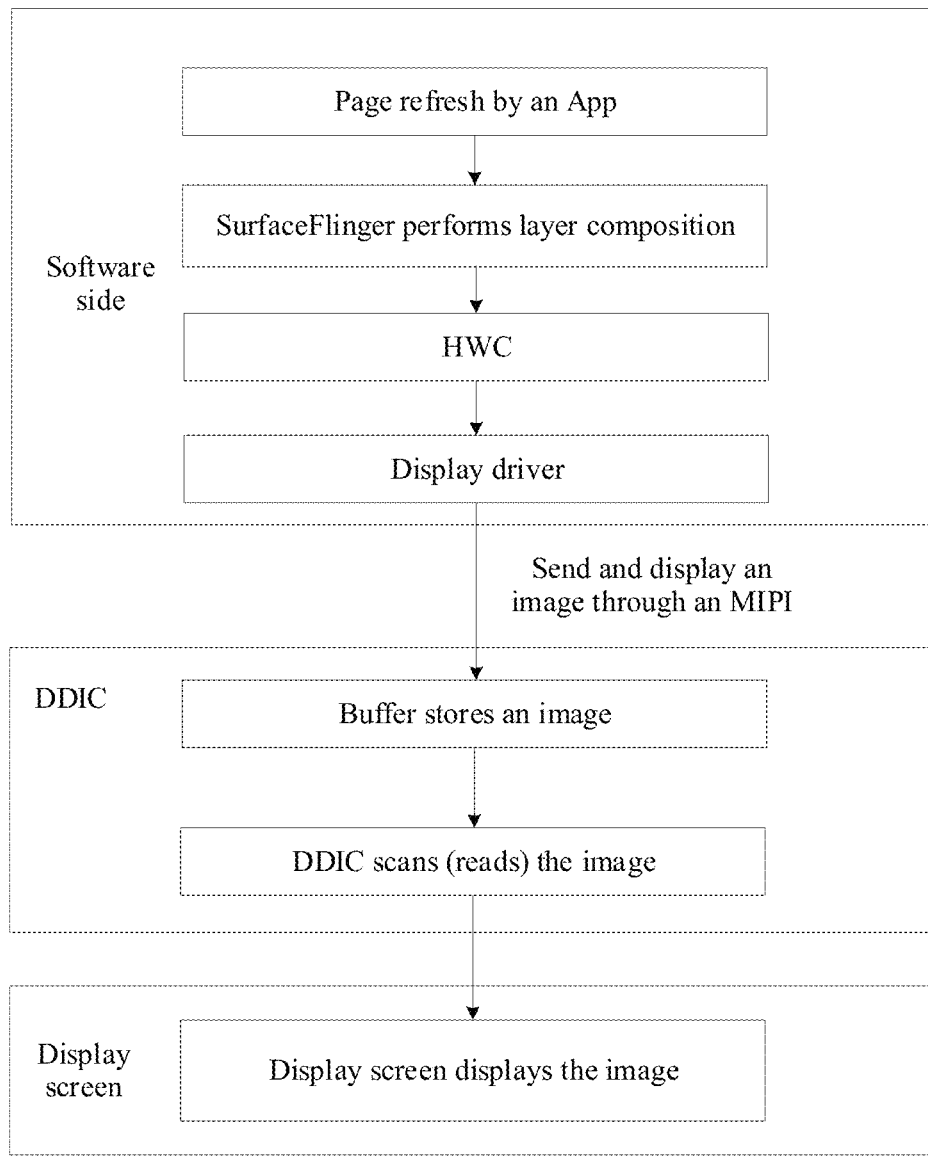
FIG. 1 is a schematic flowchart of image sending and displaying according to an embodiment of this application.

To make the objectives, technical solutions, and advantages of embodiments of this application clearer, the following clearly and completely describes the technical solutions in embodiments of this application with reference to the accompanying drawings in embodiments of this application. It is clear that the described embodiments are merely some rather than all of embodiments of this application. All other embodiments obtained by a person of ordinary skill in the art based on embodiments of this application without creative efforts shall fall within the protection scope of this application.

When ordinal numbers such as a term "first" or "second" is mentioned in this application, it should be understood the term "first" or "second" is only used for distinguishing unless really expressing the meaning of a sequence based on the context. Terms such as "example" or "for example" are used for representing giving an example, an illustration, or descriptions. Any embodiment or design solution described as an "example" or "for example" in embodiments of this application should not be explained as being more preferred or having more advantages than another implementation or design solution. To be precise, the word such as "example" or "for example" is intended to present a related concept in a specific manner.

Unless otherwise specified, "/" in this specification represents an "or" relationship between associated objects. For example, A/B may represent A or B. The term "and/or" describes only an association relationship for describing associated objects and represents that three relationships may exist. For example, A and/or B may represent the following three cases: Only A exists, both A and B exist, and only B exists. In addition, in the description of this application, "a plurality of" means two or more than two.

A term "user interface (user interface. UI)" in the following embodiments of this application is a medium interface for interaction and information exchange between an application or an operating system and a user, and implements conversion between an internal form of information and a form that can be accepted by the user. The user interface is source code written in a specific computer language such as Java or an extensible markup language (extensible markup language, XML). Interface source code is parsed and rendered on an electronic device, and is finally presented as content that can be recognized by the user. The user interface is usually represented in a form of a graphical user interface (graphic user interface, GUI), and is a user interface that is related to a computer operation and that is displayed in a graphic manner. The user interface may be a visual interface element such as a text, an icon, a button, a menu, a tab, a text box, a dialog box, a status bar, a navigation bar, or a Widget that is displayed on a display screen of the electronic device.

Before introducing embodiments of a method for controlling dynamic change of a screen refresh rate and an electronic device provided in this application, some terms in embodiments of this application are explained to be understood by a person skilled in the art.

(1) A frame rate (frame rate), also referred to as a frame rate, is in a unit of frame per second, and is referred to as FPS for short. The frame rate means a quantity of picture frames generated by a graphics card (GPU) in a unit of second, that is, a quantity of images that can be rendered and sent and displayed by the graphics card (GPU) per second. For example, the frame rate may be 30 FPS or 60 FPS.

A plurality of frames of still images are displayed quickly and continuously to form dynamic images. As a frame rate of a video is higher, continuity of the images is better. A smoother and more vivid image may be obtained based on a high frame rate. As there are more frames per second, actions are displayed more smoothly, so that images have better quality.

(2) A screen refresh rate means a quantity of times for which an image can be refreshed on a screen per second, with a unit of Hertz (Hz). For example, a 60 Hz screen means that refresh for 60 times can be completed on a screen within one second. Similarly, a 120 Hz screen means that refresh for 120 times can be completed on a screen within one second. Therefore, as a refresh rate is higher, the screen can display more frames. Correspondingly, an image has a low delay and greater smoothness.

(3) In a dynamic display scenario (also referred to a dynamic effect display scenario) in which a user plays games, watches a video, or the like by using an electronic device, when a refresh rate and frame rate of a display are not synchronized, for example, if a quantity of frames per second is large (for example, 90 FPS or 120 FPS) but the refresh rate is low (for example, 30 Hz), there is image freezing, and even a tearing effect (tearing effect, TE) caused by dislocation of a screen image occurs. For example, this situation most frequently occurs in dynamic display scenario (such as games) with a frame rate of 60 frames per second or above.

(4) Vertical synchronization (Vsync) is used for synchronizing the refresh rate and frame rate of the display, to prevent the tearing effect from occurring on a screen.

(5) A frequency conversion display manner of a display screen means that a screen of the electronic device may support dynamic switching of a refresh rate within a range, for example, switching between 1 Hz and 120 Hz, and provides a basic physical condition for supporting dynamic change of the refresh rate in each dynamic display scenario of an electronic device system, to achieve a more optimal power saving effect.

A conventional image drawing and display process are described below with reference to FIG. 1. As shown in FIG. 1, in an Android (Android) system, image drawing and display are to be completed through matching by a software side, a display driver integrated circuit (display driver integrated circuit, DDIC), and a display screen. The software side first performs page refresh by an application (application, App), and then performs layer composition by SurfaceFlinger, to obtain image data. Then the image data is sent and displayed (written) into the DDIC through a mobile industry processor interface (mobile industry processor interface. MIPI) after passing an HWC and display driver. The DDIC stores the image data sent and displayed by the software side in a buffer (buffer), and controls, by scanning (reading) the image data in the buffer, the display screen (such as an OLED or an LCD) to complete refresh rate switching, and image refresh and display (display) are performed on the display screen. In a high refresh rate display scenario, the software side generates image data at a high frequency. Correspondingly, the display screen refreshes an image at a high frequency based on the image data, to increase image smoothness.

To prevent a tearing effect from occurring on a screen image, after completing the refresh rate switching, the DDIC may output a TE signal based on a Vsync periodicity. The TE signal indicates the software side to send the image data. When the software side listens to and obtains a rising edge of the TE signal or a high level of the TE signal and a next frame of image data is determined, the software side sends the next frame of image data to the DDIC.

That is, layer drawing and rendering performed by the App and layer composition performed by the SurfaceFlinger are both controlled by the Vsync period. The Vsync periodicity determines a changing speed of an image presented on the screen after the user taps or slides on the screen. Both the App and SurfaceFlinger need to perform layer drawing only after receiving the TE signal.

Because human eyes are sensitive to moving objects, a relatively high screen refresh rate is required in various dynamic display scenarios. When the electronic device senses appearance of a dynamic display scenario, a current screen refresh rate may be switched to the relatively high screen refresh rate, to satisfy a high frame rate display demand of the dynamic display scenario. In this case, if there is a long delay during switching of the screen refresh rate, a tearing effect caused by dislocation of a screen image still occurs, and a user also feels image freezing.

Based on this, an embodiment of this application provides a method for controlling dynamic change of a screen refresh rate and an electronic device, to improve user experience by improving a bottom layer of a mobile phone system. The electronic device provided in this application is described in an example with reference to a specific embodiment.

Figure 2:
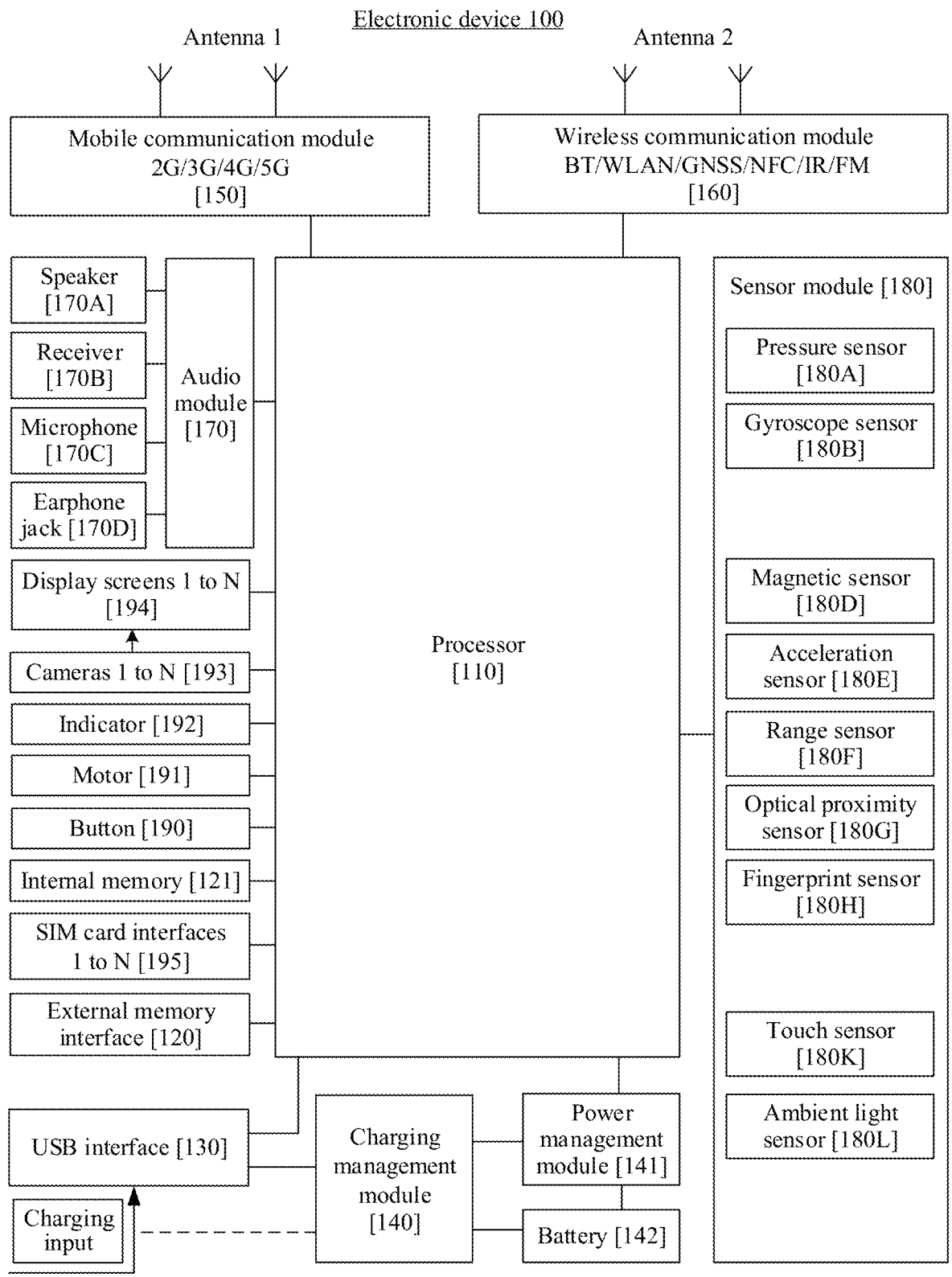
FIG. 2 is a schematic diagram of a structure of an electronic device according to an embodiment of this application.

FIG. 2 is a schematic diagram of a structure of an electronic device according to an embodiment of this application. The electronic device 100 may include a processor 110, an external memory interface 120, an internal memory 121, a universal serial bus (universal serial bus, USB) port 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display screen 194, a subscriber identification module (subscriber identification module, SIM) card interface 195, and the like. The sensor module 180 may include a pressure sensor 180A, a gyroscope sensor 180B, a magnetic sensor 180D, an acceleration sensor 180E, a range sensor 180F, an optical proximity sensor 180G, a fingerprint sensor 180H, a touch sensor 180K, an ambient optical sensor 180L, and the like.

It may be understood that a structure shown in this embodiment of this application does not constitute a specific limitation on the electronic device 100. In some other embodiments of this application, the electronic device 100 may include more or fewer components than those shown in the figure, or combine some components, or split some components, or have a different component arrangement. The components shown in the figure may be implemented in hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent components, or may be integrated into one or more processors. For example, the processor 110 is configured to perform a method for detecting ambient light in an embodiment of this application.

The controller may be a nerve center and a command center of the electronic device 100. The controller may generate an operation control signal based on instruction operation code and a time sequence signal, to complete control of instruction reading and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or data again, the processor 110 may directly invoke the instructions or data from the memory. This prevents repeated access, reduces waiting time of the processor 110, and increases system efficiency.

The electronic device 100 implements a display function by using the GPU, the display screen 194, the application processor, and the like. The GPU is a microprocessor for image processing, and is connected to the display screen 194 and the application processor. The GPU is configured to perform mathematical and geometric computation, and render an image. The processor 110 may include one or more GPUs and execute program instructions to generate or change display information.

The display screen 194 is configured to display an image, a video, and the like. The display screen 194 includes a display panel. The display panel may be an organic light-emitting diode (organic light-emitting diode, OLED). In some embodiments, the electronic device 100 may include one or N display screens 194, where N is a positive integer greater than 1.

The electronic device 100 may include a refresh rate decision making module. The refresh rate decision making module is configured to achieve a function of dynamic change of a refresh rate.

The electronic device may be a portable terminal device equipped with an iOS, an Android, a Microsoft, or another operating system, such as a mobile phone, a tablet computer, a wearable device, or the like, or may alternatively be a non-portable terminal device such as a laptop (laptop) with a touch-sensitive surface or a touch panel, or a desktop computer with a touch-sensitive surface or a touch panel. A software system of the electronic device 100 may use a layered architecture, an event-driven architecture, a micro-kernel architecture, a micro service architecture, or a cloud architecture. In embodiments of this application, an Android system of a layered architecture is used as an example to describe a software structure of the electronic device 100.

Figure 3:
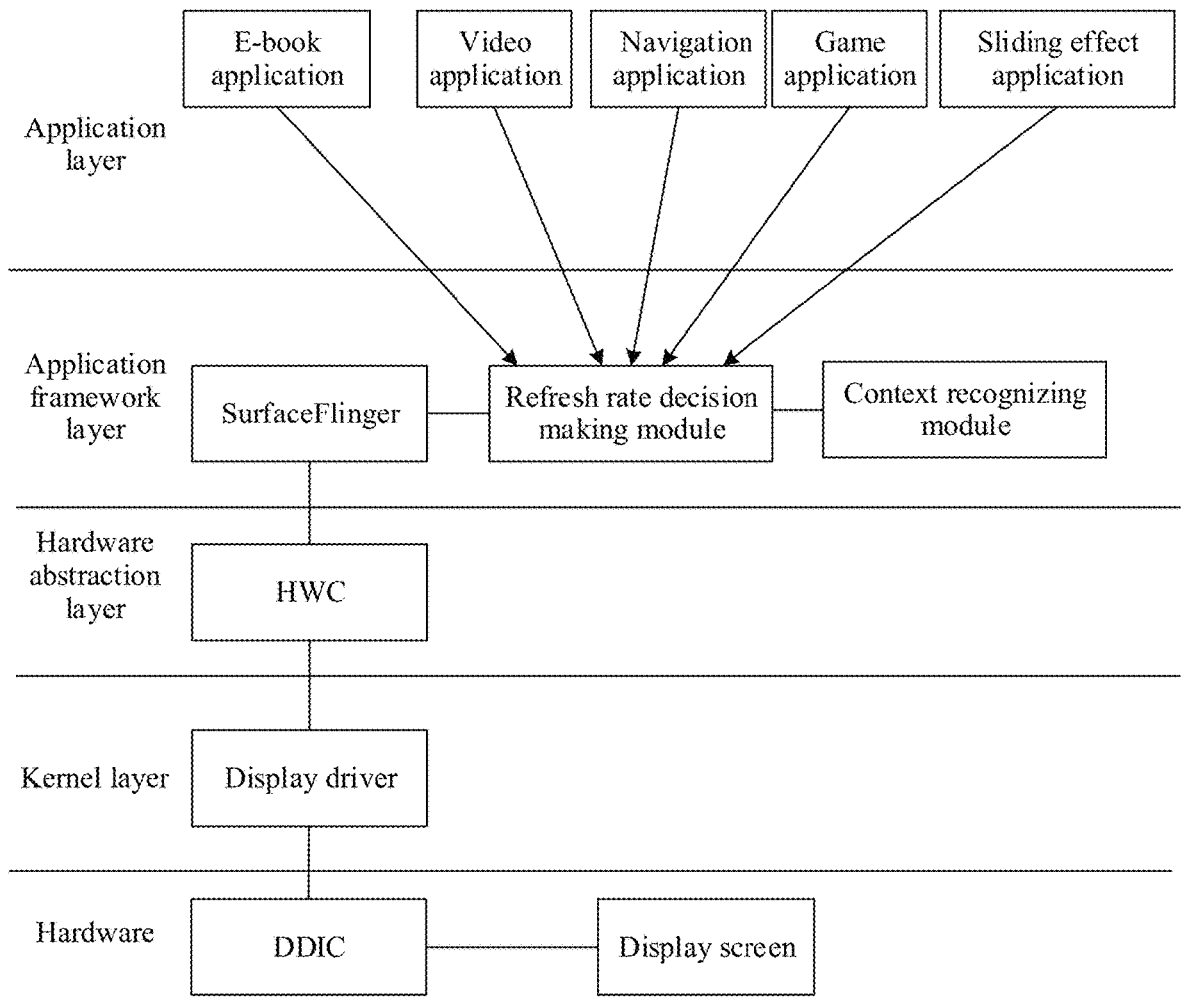
FIG. 3 is a schematic diagram of a software architecture of application of a method for controlling dynamic change of a screen refresh rate according to an embodiment of this application.

FIG. 3 is a block diagram of a software structure of an electronic device 100 according to an embodiment of this application.

Software is divided into several layers by using the layered architecture, and each layer has a clear role and task. The layers communicate with each other by using a software interface. In some embodiments, an Android system is divided into four layers, that is, an application layer (applications), an application framework layer (application framework), a hardware abstract layer (hardware abstract layer, HAL), and a kernel layer (kernel) from top to bottom.

The application layer may include a series of application packages. An application may be briefly referred to as an application. As shown in FIG. 3, the application layer may include an e-book application, a video application, a navigation application, a game application, a sliding effect application, and the like, which is not limited in any manner in this embodiment of this application.

The application framework layer provides an application programming interface (application programming interface, API) and a programming framework for an application at the application layer. The application framework layer includes some predefined functions.

As shown in FIG. 3, the application framework layer may include a refresh rate decision making module and a SurfaceFlinger module. The refresh rate decision making module may inform the SurfaceFlinger module of a latest refresh rate, send the refresh rate to a display driver through the SurfaceFlinger module, and send the refresh rate to a DDIC through the display driver, and then the DDIC controls a display to refresh and display an image at the refresh rate.

In this embodiment of this application, the application framework layer may further include a context awareness module, the refresh rate decision making module, and the like. The context awareness module runs permanently or in a form of low power consumption, and has a capability of perceiving an external fact or environment. The context awareness module may detect a related event from an application of an application layer, a hardware abstraction layer, or a kernel layer through an application programming interface (application programming interface, API), and obtain a status of an event, such as detecting Bluetooth connection, network connection, and the like.

In this embodiment of this application, a main function of the context awareness module is to listen whether a dynamic event occurs, that is, to determine whether a current application scenario is a dynamic display scenario based on a tapping operation or sliding operation triggered by a user, and the context awareness module informs a service logic processing module of occurrence of the dynamic display scenario. The service logic processing module (such as a computing engine) has a service logic processing capability and may be configured to determine a screen refresh rate appropriate for the dynamic display scenario based on a type of the dynamic display scenario. Further, the service logic processing module switches a current screen refresh rate to a screen refresh rate appropriate for the dynamic display scenario, to achieve dynamic change of screen resolution.

The application layer and the application framework layer run on a virtual machine. The virtual machine executes java files at the application layer and the application framework layer as binary files. The virtual machine is configured to implement functions such as object lifecycle management, stack management, thread management, security and exception management, and garbage collection.

As shown in FIG. 3, the kernel layer is a layer between hardware and software. The kernel layer includes at least a display driver. Specifically, in a solution in this application, hardware described may include a display driver integrated circuit (display driver integrated circuit, DDIC) and a display screen (such as an OLED or an LCD). The display driver is configured to drive the DDIC to complete processing and implementation of display.

The hardware abstraction layer may include a hardware composer (hwcomposer, HWC). The HWC has a function or capability of combining and displaying image data by hardware. Image display may be specifically completed through matching by a plurality of classes such as the SurfaceFlinger, the HWC, the display screen (panel), and the like.

The HWC is a HAL layer module for composing and displaying a window/layer (layer) in the Android system. The HWC is implemented for a specific device, is usually completed by a display device manufacturer (OEM), and provides hardware support for the SurfaceFlinger service.

The SurfaceFlinger provides all software layer information to the HWC and asks how the HWC processes the software layer information. Further, the HWC determines whether to use a hardware layer compositor or GPU for composition based on hardware performance. For example, the HWC marks a composition manner for each layer, that is, composition by the GPU or the HWC. On the one hand, the SurfaceFlinger processes a software layer to be composed by the GPU and submits a result to the HWC for display; on the other hand, a software layer to be composed by the hardware layer compositor is processed by the HWC.

The SurfaceFlinger may use a 3D graphics processing library (such as an OpenGL ES) to compose a layer, which is to occupy and consume GPU resources. Most GPUs do not optimize layer composition. When the SurfaceFlinger composes a layer through the GPU, an application cannot use the GPU for rendering the application. The HWC performs layer composition by using a hardware device, to reduce a composition pressure of the GPU.

However, the HWC is not more efficient than the GPU in all cases. For example, when there is no any change on a screen, especially when there are transparent pixels in an overlay layer and mixture of the transparent pixels in the layer is required. In this case, the HWC may require that some or all of the overlay layers to be composed by the GPU, and then the HWC holds a composition result buffer (buffer). If the SurfaceFlinger requires that a list of same overlay layers is to be composed, the HWC may directly display a previously composition result buffer, helping to increase battery life of a standby device.

The HWC also provides a Vsync event, to manage an occasion for layer rendering and composition.

In the related art (as shown in FIG. 3), a switching process of a screen refresh rate includes the following steps: The refresh rate decision making module first informs the SurfaceFlinger of a refresh rate switching instruction, and then sends the refresh rate switching instruction through the SurfaceFlinger to reach the HWC and then to the display driver, the display driver informs, after receiving the refresh rate switching instruction, the DDIC of switching to a target refresh rate, the DDIC drives a display screen (such as an OLED or an LCD) to complete the refresh rate switching, the DDIC returns a new TE signal to the display driver, and the display driver reports the new TE signal, and then the SurfaceFlinger receives the new TE signal and informs the App of switching to a new refresh rate. In this manner, both the APP and the SurfaceFlinger need to perform layer drawing only after receiving the TE signal.

Figure 4:
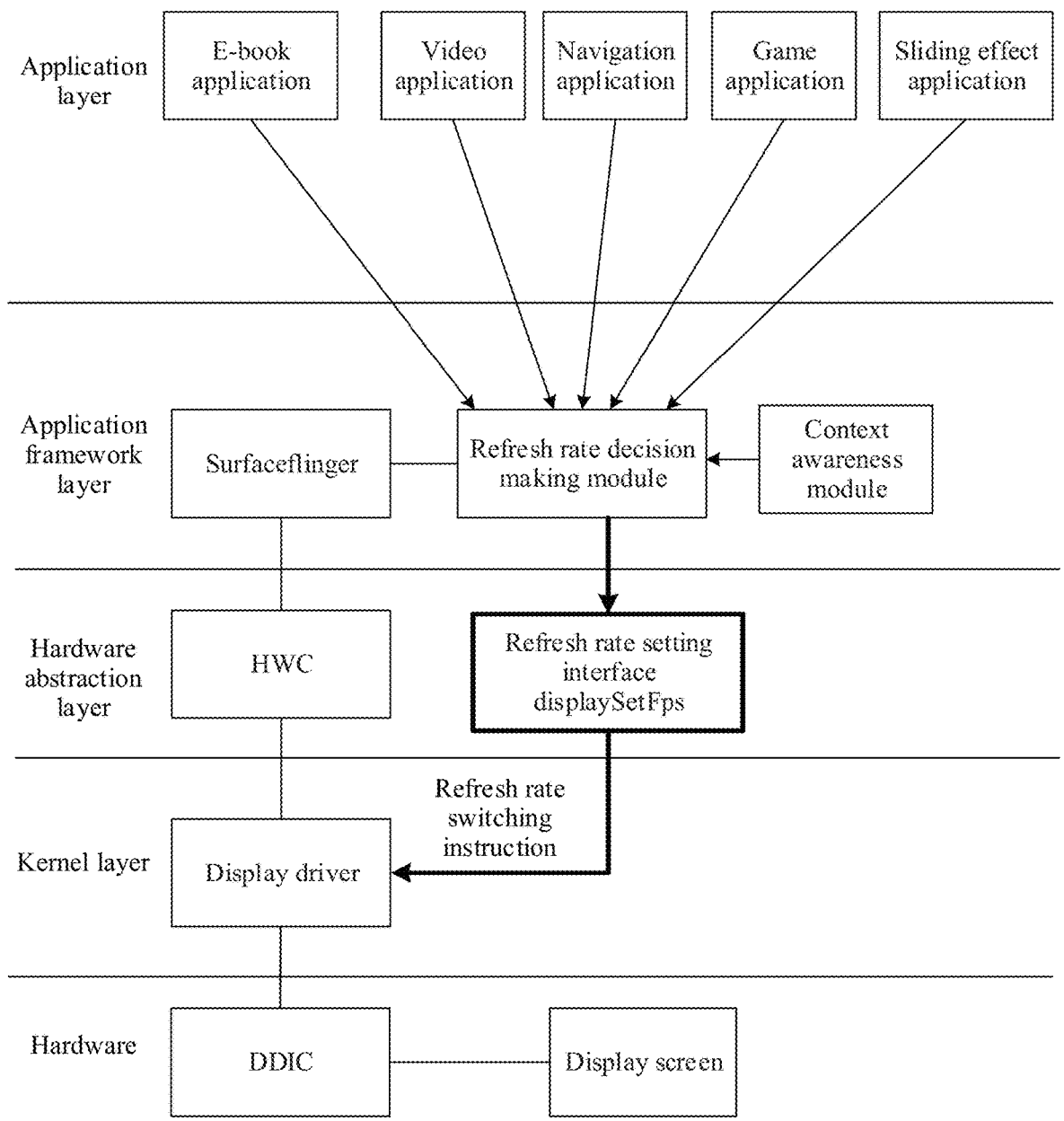
FIG. 4 is a schematic diagram of an improved software architecture of application of a method for controlling dynamic change of a screen refresh rate according to an embodiment of this application.

FIG. 4 is a framework of an improved software structure of an electronic device 100 according to an embodiment of this application, and shows a schematic diagram of an improved system-level interaction according to an embodiment of this application. The improved solution can increase a speed of dynamic change of a screen refresh rate, to prevent the foregoing tearing effect from occurring in the dynamic display scenario.

A bottom layer of a system is improved in this embodiment of this application. As shown in FIG. 4, based on the software architecture shown in FIG. 3, a new path is added in the solution in this application. A display refresh rate setting interface (display SetFps) is used in the added path, to implement sending of a refresh rate switching instruction. Specifically, a refresh rate decision making module may directly send the refresh rate switching instruction to a display driver by using a display SetFps module. Compared with the software architecture shown in FIG. 3, the refresh rate switching instruction in FIG. 4 is no longer sent by using the SurfaceFlinger. Therefore, the refresh rate switching instruction may be immediately sent to the display driver (or an HWC) within a current $i^{th}$ frame period, before a current Vsync periodicity (a first Vsync period, for example, 8 ms) ends. Then, after receiving the refresh rate switching instruction within the $i^{th}$ frame period, the display driver informs a DDIC of switching to a target refresh rate, and the DDIC drives a display screen (such as an OLED or an LCD) to complete refresh rate switching. After the refresh rate of the DDIC at a bottom layer of hardware is successfully switched, a frame rate of SurfaceFlinger at an upper layer needs to be switched accordingly. Therefore, the DDIC may report a TE signal to the upper layer, to indicate that the upper layer switches to a new frame rate, that is, sends and displays an image based on a new Vsync periodicity. The DDIC returns a new TE signal (corresponding to a second Vsync period, for example, 11 ms) to the display driver; and then the display driver reports the new TE signal. After receiving the new TE signal, the SurfaceFlinger sets the Vsync periodicity as the second Vsync period. In this manner, the SurfaceFlinger may subsequently send the refresh rate switching instruction based on the second Vsync periodicity.

In this embodiment of this application, a switching speed of a screen refresh rate may be increased by adding a new path, to rapidly complete switching of the screen refresh rate. This reduces a delay and prevent image freezing to some extent. For example, it can be ensured that each switching of the screen refresh rate may be completed within one frame, for example, within 8 ms.

For example, in this embodiment of this application, a dynamic display scenario supported by an electronic device system may include: dynamic display of an image during start of an application, dynamic display of an image during closing of an application, dynamic display of an image during returning to a previous menu, and/or dynamic display of an image during sliding on an application list. It may be understood that the dynamic display scenario may further include any other possible dynamic effect display scenario for an image, which may be determined based on actual use requirements, and is not limited in this embodiment of this application.

For example, in this embodiment of this application, a dynamic change range of the refresh rate may include the following refresh rate levels: 120 Hz, 90 Hz, 60 Hz, 40 Hz, 30 Hz, 10 Hz, and 1 Hz.

Taking 120 Hz as an example, 120 Hz means that the display screen is refreshed for 120 times per second. Correspondingly, duration required for each refresh is approximately 8 milliseconds (ms). It may be understood that display duration (also referred to as a frame length) of each frame may be approximately 8 ms.

Taking 90 Hz as an example, 90 Hz means that the display screen is refreshed for 90 times per second. Correspondingly, duration required for each refresh is approximately 11 ms. It may be understood that the frame length of each frame may be approximately 11 ms.

Taking 1 Hz as an example, 1 Hz means that the display screen is refreshed for 1 times per second. Correspondingly, duration required for each refresh is approximately 1 second (s). It may be understood that the frame length of each frame may be approximately 1 s.

It may be understood that as the screen refresh rate is larger, smoothness of an image is greater, which is appropriate for the dynamic display scenario. On the contrary, as the screen refresh rate is smaller, the smoothness of an image is lesser, which is appropriate for a static display scenario.

Figure 5A:
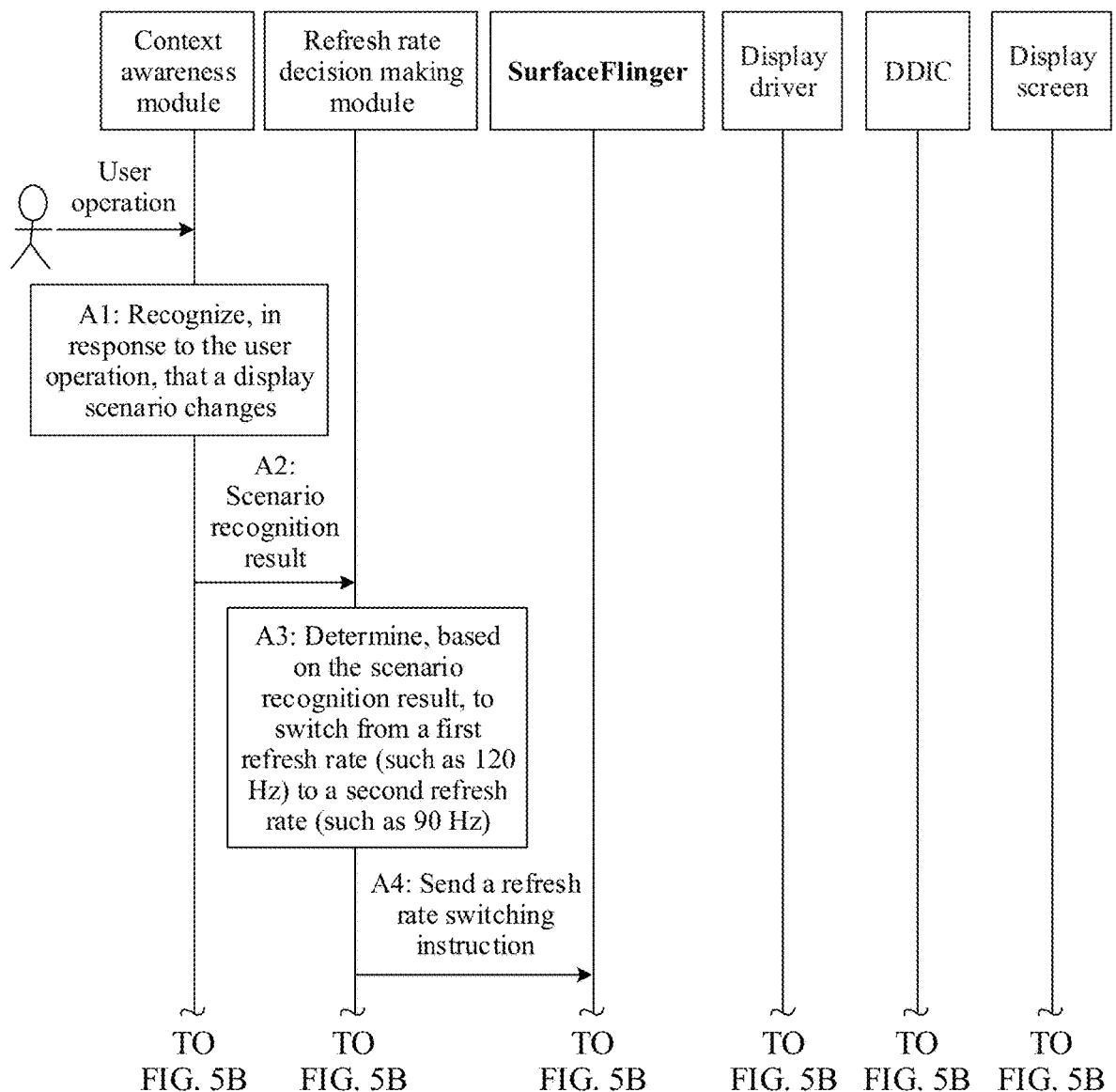
FIG. 5A and FIG. 5B are a schematic flowchart of a method for controlling dynamic change of a screen refresh rate according to an embodiment of this application.
Figure 5B:
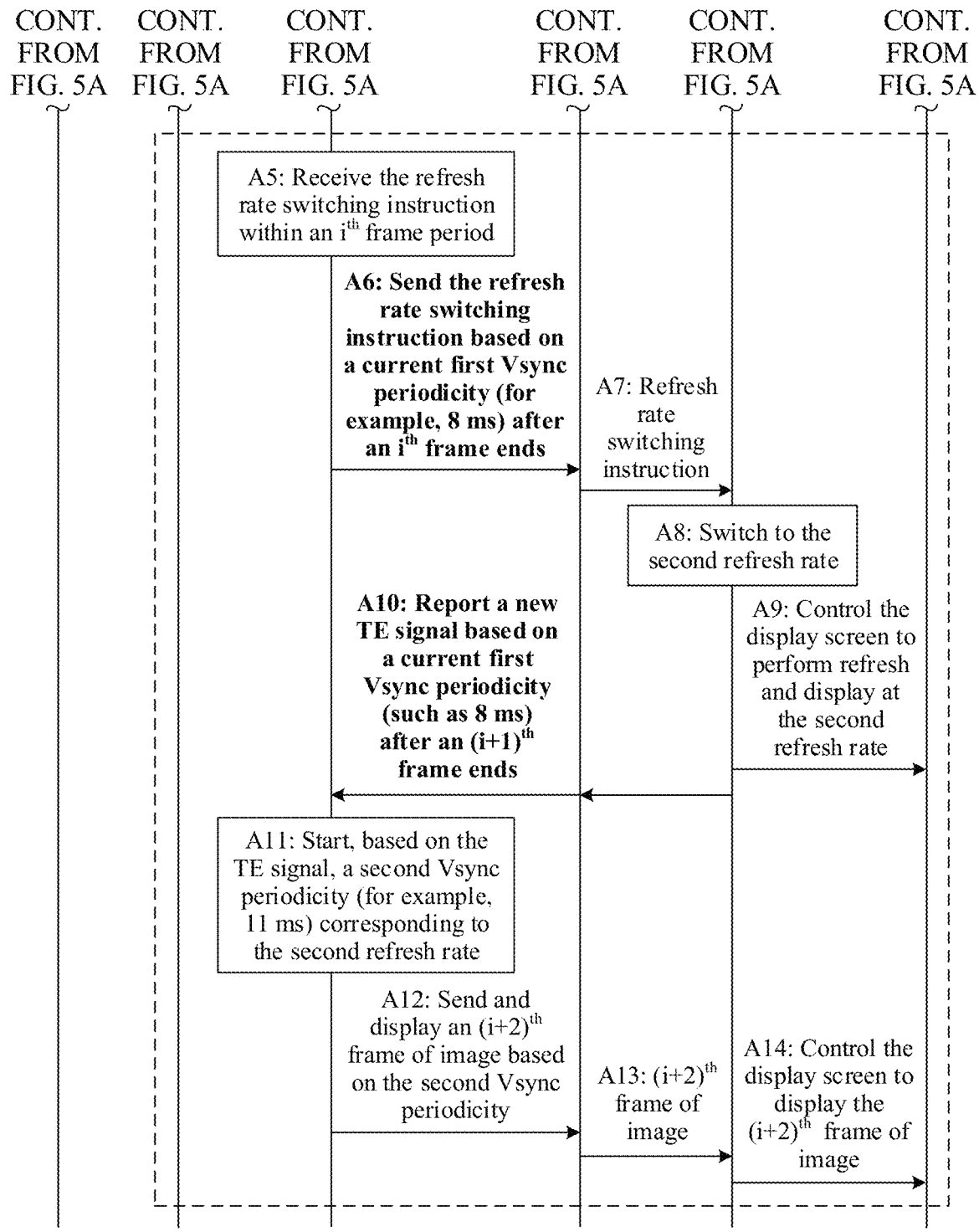

FIG. 5A and FIG. 5B show a schematic diagram of module interaction of an original refresh rate switching process of an Android (Android) system. As shown in FIG. 5A and FIG. 5B, modules in this process may include a context awareness module, a refresh rate decision making module, SurfaceFlinger, a display driver, a DDIC, and a display screen. It may be understood that the modules described herein are main modules to achieve this process, and include other modules in actual implementation, which may be determined based on actual use requirements, and is not limited in this embodiment of this application. As shown in FIG. 5A and FIG. 5B, the process may include step A1 to step A14.

Step A1: When an electronic device receives a user operation (such as a sliding operation), the context awareness module may recognize, in response to the user operation, that a display scenario changes.

Optionally, a scenario recognition result may include a static display scenario and a dynamic display scenario. Of course, a scenario recognition result with more detailed division may be alternatively included, such as the static display scenario, a relatively static display scenario, a relatively dynamic display scenario, and a dynamic display scenario.

Step A2: The context awareness module sends the scenario recognition result to the refresh rate decision making module.

Step A3: The refresh rate decision making module determines a refresh rate corresponding to the scenario recognition result based on the scenario recognition result.

For ease of explanation, a current refresh rate is referred to as a first refresh rate, and a refresh rate corresponding to the scenario recognition result is referred to as a second refresh rate.

A screen refresh rate corresponding to the static display scenario is lower than a screen refresh rate corresponding to the dynamic display scenario.

For example, the screen refresh rate corresponding to the static display scenario may be 1 Hz or 10 Hz, and the screen refresh rate corresponding to the dynamic display scenario may be 60 Hz, 90 Hz, or 120 Hz.

For another example, the screen refresh rate corresponding to the static display scenario may be 1 Hz or 10 Hz, a screen refresh rate corresponding to the relatively static display scenario may be 30 Hz or 40 Hz, a screen refresh rate corresponding to the relatively dynamic display scenario may be 60 Hz, and the screen refresh rate corresponding to the dynamic display scenario may be 90 Hz or 120 Hz.

Step A4: The refresh rate decision making module sends a refresh rate switching instruction to the SurfaceFlinger, where the refresh rate switching instruction instructs to switch from the first refresh rate to the second refresh rate.

The refresh rate decision making module may invoke a refresh rate setting interface setActiveMode of the Surface- Flinger after receiving a user's operation (such as a tapping event) on the electronic device.

Step A5: The SurfaceFlinger receives the refresh rate switching instruction within an $i^{th}$ frame period.

For example, assuming that the current first refresh rate is 120 Hz, corresponding duration of each frame may be approximately 8 ms. Correspondingly, a Vsync periodicity may be set to 8 ms. Therefore, the $i^{th}$ frame period may be 8 ms.

Step A6: The SurfaceFlinger sends the refresh rate switching instruction after the $i^{th}$ frame within a current first Vsync periodicity ends.

For example, the first Vsync periodicity may be 8 ms.

The refresh rate switching instruction instructs to switch from the current first refresh rate to the second refresh rate.

Step A7: After receiving the refresh rate switching instruction, the display driver sends the refresh rate switching instruction to the DDIC.

The refresh rate switching instruction sent by the SurfaceFlinger first reaches an HWC, and then reaches the display driver. For ease of explanation, the HWC module is not shown herein.

Step A8: The DDIC switches from the first refresh rate to the second refresh rate based on the refresh rate switching instruction.

Step A9: The DDIC controls the display screen to perform refresh and display at the second refresh rate.

The DDIC controls the display screen to perform refresh at a refresh rate of 90 Hz, that is, for 90 times per second.

Step A10: The DDIC reports a new TE signal based on the current first Vsync periodicity after an $(i+1)^{th}$ frame period ends.

The first Vsync periodicity is 8 ms, and the $(i+1)^{th}$ frame period is also 8 ms.

It may be understood that, to prevent a tearing effect from occurring on a screen image, the DDIC may output a TE signal based on the Vsync periodicity. The TE signal indicates the SurfaceFlinger to send (send and display) image data. When the SurfaceFlinger listens to and obtains a rising edge of the TE signal or a high level of the TE signal and a next frame of image data is determined, the SurfaceFlinger sends the next frame of image data to the DDIC.

That is, all layer composition performed by the SurfaceFlinger is controlled based on the Vsync periodicity. The Vsync periodicity determines a changing speed of images presented on a screen after the user taps or slides on the screen. The SurfaceFlinger needs to perform sending and displaying only after receiving the TE signal.

It should be noted that the new TE signal reaches the display driver, the HWC, and the SurfaceFlinger successively.

Step A11: The SurfaceFlinger sets the Vsync periodicity as a second Vsync periodicity, and the second Vsync periodicity corresponds to the second refresh rate.

Assuming that the second refresh rate is 90 Hz, duration of each frame may be approximately 11 ms correspondingly. Correspondingly, the second Vsync periodicity may be set to 11 ms.

Step A12: The SurfaceFlinger sends the refresh rate switching instruction based on the second Vsync periodicity.

Step A13: After receiving the refresh rate switching instruction, the display driver sends the refresh rate switching instruction to the DDIC.

Step A14: The DDIC controls the display screen to switch to an $(i+2)^{th}$ frame for display.

It may be known from FIG. 5A and FIG. 5B that, when the refresh rate changes dynamically every time, after the SurfaceFlinger receives the refresh rate switching instruction, the SurfaceFlinger still sends the refresh rate switching instruction based on the current first Vsync periodicity, for example, is to send the refresh rate switching instruction after waiting for approximately 8 ms. In addition, the DDIC still reports the TE signal based on the current first Vsync periodicity, for example, is to report the new TE signal after waiting for approximately 8 ms. In this manner, each refresh rate switching process may be completed within 2 frames, which takes approximately 16 ms.

Figure 6A:
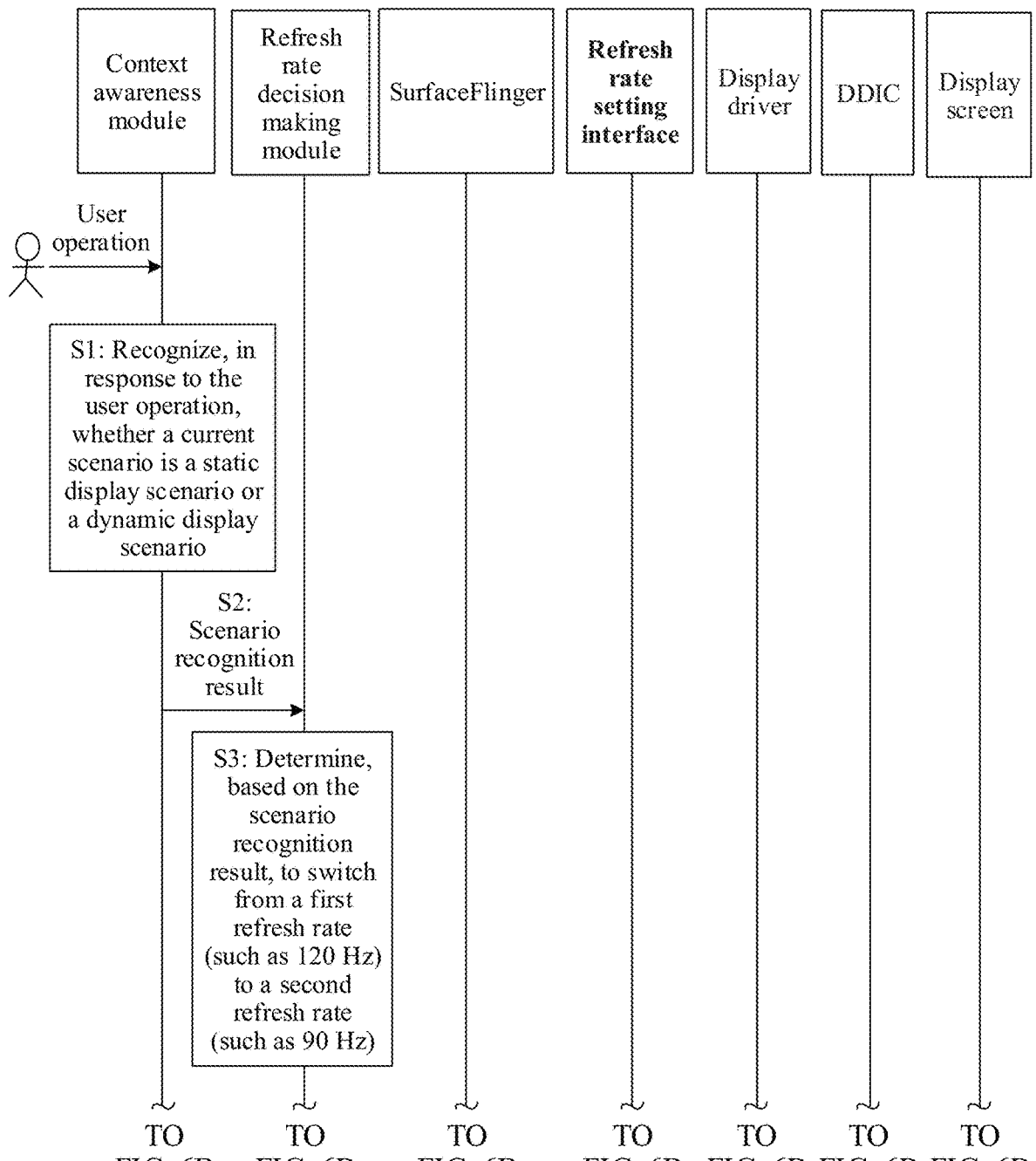
FIG. 6A and FIG. 6B are a schematic flowchart of an improved method for controlling dynamic change of a screen refresh rate according to an embodiment of this application.
Figure 6B:
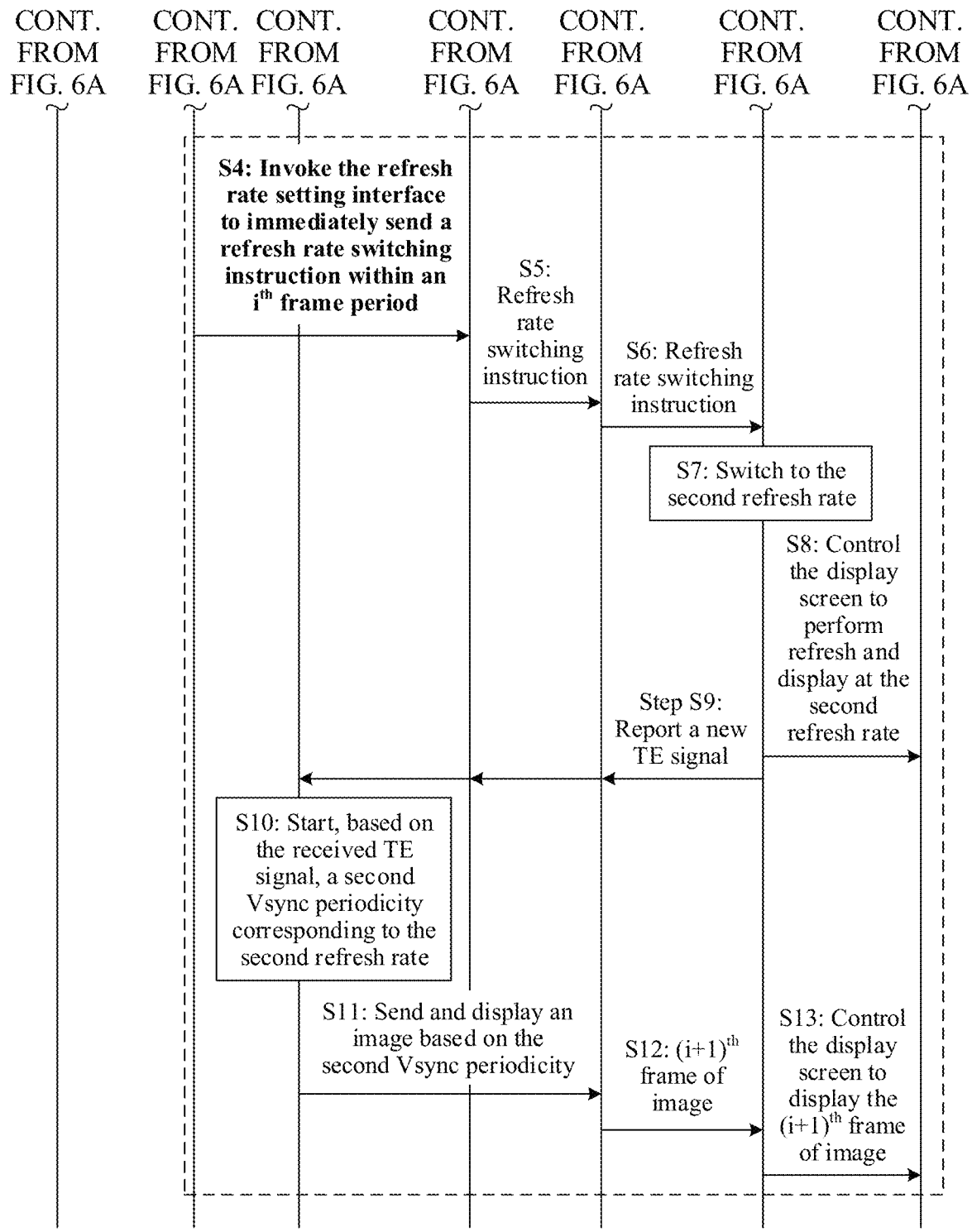

FIG. 6A and FIG. 6B show a schematic diagram of module interaction of a refresh rate switching process according to an embodiment of this application. As shown in FIG. 6A and FIG. 6B, modules in this process may include a context awareness module, a refresh rate decision making module, SurfaceFlinger, a refresh rate setting interface, a display driver, a DDIC, and a display screen. Compared with the Android original process of FIG. 5A and FIG. 5B, the refresh rate setting interface is added in FIG. 6A and FIG. 6B.

It may be understood that the modules described herein are main modules to achieve this process, and include other modules in actual implementation, which may be determined based on actual use requirements, and is not limited in this embodiment of this application. The following describes how to trigger Vsync periodicity update, frame rate switching, and refresh rate switching through an added path after detecting scenario change. As shown in FIG. 6A and FIG. 6B, the process may include step S1 to step S13.

Step S1: When an electronic device receives a user operation (such as a sliding operation), the context awareness module may recognize, in response to the user operation, that a display scenario changes.

Optionally, a scenario recognition result may include a static display scenario and a dynamic display scenario. Of course, a scenario recognition result with more detailed division may be alternatively included, such as the static display scenario, a relatively static display scenario, a relatively dynamic display scenario, and a dynamic display scenario.

Step S2: The context awareness module sends the scenario recognition result to the refresh rate decision making module.

Step S3: The refresh rate decision making module determines a refresh rate corresponding to the scenario recognition result based on the scenario recognition result.

For ease of explanation, a current refresh rate is referred to as a first refresh rate, and a refresh rate corresponding to the scenario recognition result is referred to as a second refresh rate.

A screen refresh rate corresponding to the static display scenario is lower than a screen refresh rate corresponding to the dynamic display scenario.

For example, the screen refresh rate corresponding to the static display scenario may be 1 Hz or 10 Hz, and the screen refresh rate corresponding to the dynamic display scenario may be 60 Hz, 90 Hz, or 120 Hz.

For another example, the screen refresh rate corresponding to the static display scenario may be 1 Hz or 10 Hz, a screen refresh rate corresponding to the relatively static display scenario may be 30 Hz or 40 Hz, a screen refresh rate corresponding to the relatively dynamic display scenario may be 60 Hz, and the screen refresh rate corresponding to the dynamic display scenario may be 90 Hz or 120 Hz.

Step S4: The refresh rate decision making module invokes the refresh rate setting interface (displaySetFps), and immediately sends a refresh rate switching instruction within a current $i^{th}$ frame period, where the refresh rate switching instruction instructs to switch from the first refresh rate to the second refresh rate.

After receiving a user's operation (such as a tapping event or a sliding event) on the electronic device, the refresh rate decision making module invokes the added refresh rate setting interface to send the refresh rate switching instruction.

Step S5: The refresh rate setting interface receives the refresh rate switching instruction within the $i^{th}$ frame period, and immediately sends the refresh rate switching instruction within the $i^{th}$ frame period.

In the solution in this application, because the refresh rate switching instruction is to be sent immediately when scenario change is sensed and the refresh rate is to be dynamically switched, it is not required to send the refresh rate switching instruction based on a current first Vsync periodicity after the $i^{th}$ frame ends. For example, assuming that the current first refresh rate is 120 Hz, corresponding duration of each frame may be approximately 8 ms. Correspondingly, the first Vsync periodicity may be set to 8 ms. A corresponding frame rate is 120 FPS. Therefore, the $i^{th}$ frame period may be 8 ms.

Step S6: After receiving the refresh rate switching instruction, the display driver sends the refresh rate switching instruction to the DDIC.

The refresh rate switching instruction first reaches an HWC, and then reaches the display driver. For ease of explanation, the HWC module is not shown herein.

Step S7: The DDIC switches from the first refresh rate to the second refresh rate based on the refresh rate switching instruction.

Step S8: The DDIC controls the display screen to perform refresh and display at the second refresh rate.

For example, the second refresh rate may be 90 Hz.

Step S9: The DDIC reports a new TE signal.

The new TE signal corresponds to a second Vsync periodicity.

It should be noted that the new TE signal reaches the display driver, the HWC, the refresh rate setting interface, and the SurfaceFlinger successively.

Step S10: The SurfaceFlinger sets the Vsync periodicity to the second Vsync periodicity corresponding to the second refresh rate based on the received TE signal.

Assuming that the second refresh rate is 90 Hz, duration of each frame may be approximately 11 ms correspondingly. Correspondingly, the second Vsync periodicity may be set to 11 ms, and a corresponding frame rate is 90 FPS. In this manner, the SurfaceFlinger switches the frame rate from 120 FPS to 90 FPS.

Step S11: The SurfaceFlinger sends and displays an image ($(i+1)^{th}$ frame of image) based on the second Vsync periodicity.

Step S12: After receiving the $(i+1)^{th}$ frame of image, the display driver sends the $(i+1)^{th}$ frame of image to the DDIC.

Step S13: The DDIC controls the display screen to display the $(i+1)^{th}$ frame of image.

Module interaction processes during implementation of methods for controlling dynamic change of a screen refresh rate according to embodiments of this application are analyzed with reference to FIG. 5A and FIG. 5B and FIG. 6A and FIG. 6B. Next, with reference to FIG. 7, a comparison diagram of a technical solution in this application with a related technical solution is described from the perspective of frames.

Figure 7:
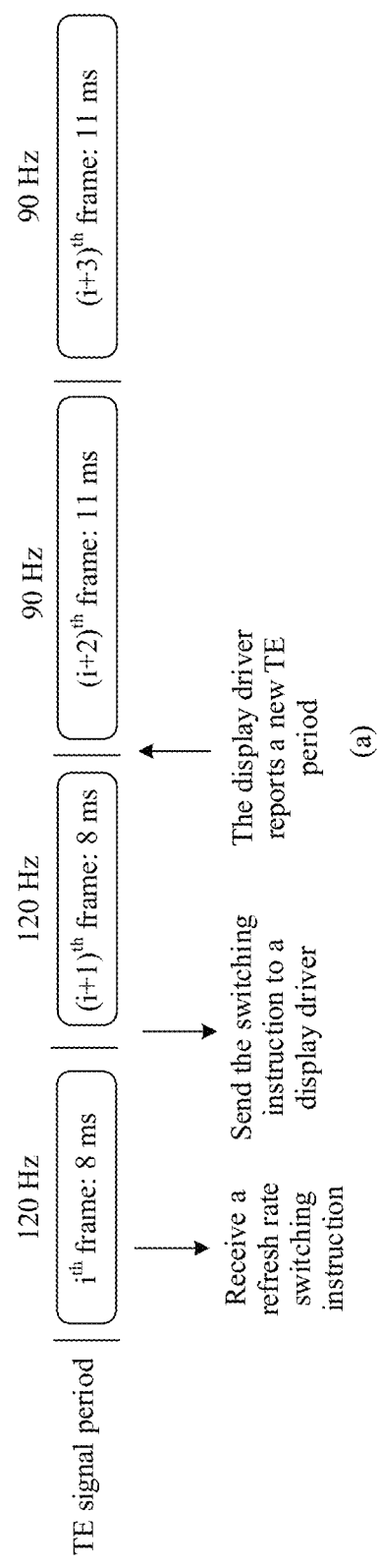
FIG. 7 is a schematic diagram of an effect of comparison of an improved method for controlling dynamic change of a screen refresh rate according to an embodiment of this application with an Android original process method.
Figure 7:
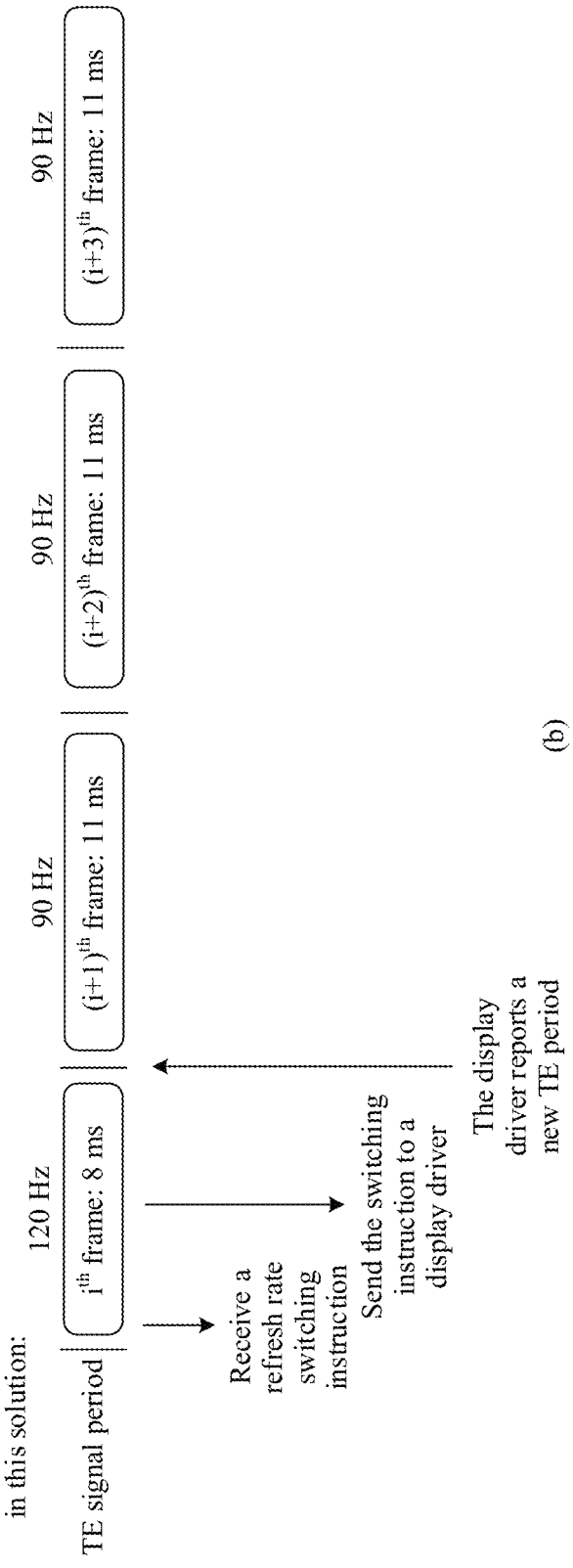

(a) of FIG. 7 shows a schematic diagram of original refresh rate switching of an Android system. As shown in (a) of FIG. 7, assuming that a current screen refresh rate is 120 Hz and a current frame is referred to as an $i^{th}$ frame, a frame length of the $i^{th}$ frame is approximately 8 ms. Within an $i^{th}$ frame period, if it is detected that a current display scenario changes and the refresh rate is to be dynamically reduced, the refresh rate decision making module sends the refresh rate switching instruction to the SurfaceFlinger. For example, the refresh rate switching instruction instructs to switch the screen refresh rate from 120 Hz to 90 Hz.

In this case, a Vsync periodicity used by the SurfaceFlinger is 8 ms, that is, the SurfaceFlinger sends the refresh rate switching instruction based on the Vsync periodicity of 8 ms. In this case, if an image is sent within the $i^{th}$ frame period, the refresh rate switching instruction is to be sent only after the $i^{th}$ frame ends and an $(i+1)^{th}$ frame starts. In this manner, the SurfaceFlinger is to send the refresh rate switching instruction to the display driver after waiting for approximately 8 ms (in actual implementation, waiting duration may be any one from 1 ms to 8 ms, and 8 ms is taken as an example). Then after receiving the refresh rate switching instruction, the display driver informs the DDIC of driving the display screen (such as an OLED or an LCD) to switch the screen refresh rate.

It should be noted that the DDIC also reports a TE signal based on the Vsync periodicity of 8 ms. When the $(i+1)^{th}$ frame ends and an $(i+2)^{th}$ frame starts, the DDIC returns a new TE signal to the display driver. The display driver reports the new TE signal to the SurfaceFlinger, that is, is to report the new TE signal after waiting approximately 8 ms. After receiving the new TE signal reported by the display driver, the SurfaceFlinger synchronously starts a new Vsync periodicity (that is, the foregoing second Vsync periodicity). The second Vsync periodicity corresponds to the second refresh rate of 90 Hz. Therefore, the second Vsync periodicity is 11 ms.

In this manner, from the $(i+2)^{th}$ frame, the SurfaceFlinger sends the refresh rate switching instruction based on the Vsync periodicity of 11 ms. Correspondingly, the DDIC may control the display screen to refresh an image at a refresh rate of 90 Hz.

It may be known from (a) of FIG. 7 that, when the refresh rate changes dynamically every time, after the SurfaceFlinger receives the refresh rate switching instruction, the SurfaceFlinger still sends the refresh rate switching instruction based on the current first Vsync periodicity, for example, is to send the refresh rate switching instruction after waiting for approximately 8 ms. In addition, the DDIC still reports the TE signal based on the current first Vsync periodicity, for example, is to report the new TE signal after waiting for approximately 8 ms. Then a new Vsync periodicity is not set to be started until the SurfaceFlinger receives the new TE signal. In this manner, each refresh rate switching process may be completed within 2 frames, which takes approximately 16 ms.

(b) of FIG. 7 shows a schematic diagram of improved refresh rate switching of the system according to an embodiment of this application. As shown in (b) of FIG. 7, still assuming that a current screen refresh rate is 120 Hz and a current frame is referred to as an $i^{th}$ frame, a frame length of the $i^{th}$ frame is approximately 8 ms. Within an $i^{th}$ frame period, if it is detected that a current display scenario changes and the refresh rate is to be dynamically reduced, the refresh rate decision making module sends the refresh rate switching instruction to the SurfaceFlinger. For example, the refresh rate switching instruction instructs to switch the screen refresh rate from 120 Hz to 90 Hz.

In this case, a Vsync periodicity used by the SurfaceFlinger is 8 ms, that is, the SurfaceFlinger sends the refresh rate switching instruction based on the Vsync periodicity of 8 ms. To quickly switch the screen refresh rate, the refresh rate switching instruction may be directly sent to the display driver within the current $i^{th}$ frame period. Then when the $i^{th}$ frame ends and an $(i+1)^{th}$ frame starts, the DDIC returns a new TE signal to the display driver, and the display driver reports the new TE signal to the SurfaceFlinger. After receiving the new TE signal reported by the display driver, the SurfaceFlinger synchronously starts a new Vsync periodicity (that is, the foregoing second Vsync periodicity). The second Vsync periodicity corresponds to the second refresh rate of 90 Hz. Therefore, the second Vsync periodicity is 11 ms.

In this manner, from the $(i+1)^{th}$ frame, the SurfaceFlinger sends the refresh rate switching instruction based on the Vsync periodicity of 11 ms. Correspondingly, the DDIC may control the display screen to refresh an image at a refresh rate of 90 Hz.

It may be known from (b) of FIG. 7 that, when the refresh rate changes dynamically every time, the refresh rate switching instruction is directly sent by invoking the refresh rate setting interface provided in the solution in this application within the current $i^{th}$ frame period, and the DDIC controls the display screen to switch the screen refresh rate based on the refresh rate switching instruction, and then reports the new TE signal. Then a new Vsync periodicity is forced to be started after the SurfaceFlinger receives the new TE signal, to ensure that a subsequent Vsync periodicity is stable. In this manner, each refresh rate switching process may be completed within 1 frames, which takes approximately 8 ms.

In this embodiment of this application, by constructing a new switching path for a screen refresh rate, the refresh rate switching instruction may be triggered to the HWC and the display driver immediately before a Vsync synchronization periodicity ends. In this manner, refresh rate switching may be completed within duration of one frame, to reduce image freezing caused by frame loss.

It should be noted that switching from a refresh rate of 120 Hz to a refresh rate of 90 Hz is used as an example in the foregoing description. It may be understood that the solution provided in this embodiment of this application may be used in actual implementation, to implement dynamic change of the refresh rate between 1 Hz and 120 Hz based on an actual use situation.

In some embodiments, the refresh rate is gradually reduced after a touch-free operation is sensed, for example, the refresh rate is reduced from 120 Hz to 90 Hz, 60 Hz, 40 Hz, 30 Hz, 10 Hz, or 1 Hz successively.

In some embodiments, the screen refresh rate may be set to 30 Hz if there is no other layer.

In some embodiments, the screen refresh rate may be set to 60 Hz if there is no other layer.

The electronic device in this embodiment of this application may be a mobile terminal or a non-mobile terminal. For example, the mobile terminal may be a mobile phone, a tablet computer, a notebook computer, a palmtop computer, a vehicle terminal, a wearable device, an ultra-mobile personal computer (ultra-mobile personal computer, UMPC), a netbook, a personal digital assistant (personal digital assistant, PDA), or the like. The non-mobile terminal may be a personal computer (personal computer, PC), a television (television, TV), a teller machine, a self-service machine, or the like. This is not specifically limited in this embodiment of this application.

The method for controlling dynamic change of a screen refresh rate provided in this embodiment of this application may be performed by the foregoing electronic device, or may alternatively be a functional module and/or functional entity, in the electronic device, that can implement the method for controlling dynamic change of a screen refresh rate. In addition, the solution in this application can be implemented by hardware and/or software, which may be specifically determined based on actual use requirements, and is not limited in this embodiment of this application. Taking the electronic device as an example, the method for controlling dynamic change of a screen refresh rate provided in an embodiment of this application is explained in an example with reference to a drawing.

It should also be noted that in this embodiment of this application, "greater than" may be replaced by "greater than or equal to", and "less than or equal to" may be replaced by "less than"; or "greater than or equal to" may be replaced by "greater than", and "less than" may be replaced by "less than or equal to".

Embodiments described in this specification may be independent solutions, or may be combined based on internal logic. All these solutions fall within the protection scope of this application.

It may be understood that the methods and operations implemented by the electronic device in the foregoing method embodiments may also be implemented by a component (for example, a chip or a circuit) that can be used in the electronic device.

The foregoing describes the method embodiment provided in this application, and the following describes apparatus embodiments provided in this application. It should be understood that descriptions of apparatus embodiments correspond to the descriptions of the method embodiment. Therefore, for content that is not described in detail, refer to the foregoing method embodiment. For brevity, details are not described herein again.

The foregoing mainly describes the solutions provided in embodiments of this application from a perspective of method steps. It may be understood that, to implement the foregoing functions, the electronic device implementing the method includes corresponding hardware structures and/or software modules for performing the functions. A person skilled in the art should be able to be aware that, in combination with the examples described in embodiments disclosed in this specification, units and algorithm steps can be implemented by hardware or a combination of hardware and computer hardware in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the protection scope of this application.

In this embodiment of this application, function module division may be performed on the electronic device according to the foregoing method example. For example, each function module may be obtained through division to correspond to each function, or two or more functions may be integrated into one processing module. The integrated module may be implemented in a form of hardware, or may be implemented in a form of a software functional module. It should be noted that in embodiments of this application, division into the modules is an example, and is merely logical function division. In actual implementation, another division manner may be used. The following provides descriptions by using an example in which the functional modules are divided based on the functions.

Optionally, in some embodiments, this application provides a chip, the chip is coupled to a memory, and the chip is configured to read and execute a computer program or instructions stored in the memory, to perform the method in each of the foregoing embodiments.

Optionally, in some embodiments, this application provides an electronic device. The electronic device includes a chip. The chip is configured to read and execute a computer program or instructions stored in a memory, to enable the method in each of the embodiments to be performed.

Optionally, in some embodiments, an embodiment of this application further provides a computer-readable storage medium. The computer-readable storage medium stores program code. When the computer program code is run on a computer, the computer is enabled to perform the method in each of the foregoing embodiments.

Optionally, in some embodiments, an embodiment of this application further provides a computer program product. The computer program product includes computer program code. When the computer program code is run on a computer, the computer is enabled to perform the method in each of the foregoing embodiments.

In embodiments of this application, an electronic device includes a hardware layer, an operating system layer running above the hardware layer, and an application layer running above the operating system layer. The hardware layer may include hardware such as a central processing unit (central processing unit, CPU), a memory management unit (memory management unit, MMU), and a memory (also referred to as a primary memory). An operating system at the operating system layer may be any one or more computer operating systems that implement service processing through a process (process), for example, a Linux operating system, a Unix operating system, an Android operating system, an iOS operating system, or a Windows operating system. The application layer may include applications such as a browser, an address book, word processing software, and instant messaging software.

A specific structure of an execution body of the method provided in embodiments of this application is not specifically limited in embodiments of this application, provided that a program that records code for the method provided in embodiments of this application can be run to perform communication according to the method provided in embodiments of this application. For example, the method provided in embodiments of this application may be performed by the electronic device, or may be performed by a functional module that is in the electronic device and that can invoke and execute a program.

Aspects or features of this application may be implemented as a method, an apparatus, or a product that uses standard programming and/or engineering technologies. The term "product" used in this specification may cover a computer program that can be accessed from any computer-readable component, carrier, or medium. For example, the computer-readable medium may include but is not limited to: a magnetic storage component (such as a hard disk, a floppy disk, or a magnetic tape), an optical disc (for example, a compact disc (compact disc, CD), a digital versatile disc (digital versatile disc, DVD)), a smart card, and a flash memory component (such as an erasable programmable read-only memory (erasable programmable read-only memory, EPROM), a card, a stick, or a key drive).

Various storage media described in this specification may indicate one or more devices and/or other machine-readable media that are configured to store information. The term "machine-readable media" may include but is not limited to a radio channel and various other media that can store, include, and/or carry instructions and/or data.

It should be understood that the processor in embodiments of this application may be a central processing unit (central processing unit, CPU), another general-purpose processor, a digital signal processor (digital signal processor, DSP), an application specific integrated circuit (application specific integrated circuit, ASIC), a field programmable gate array (field programmable gate array, FPGA) or another programmable logic device, a discrete gate or transistor logic device, a discrete hardware component, or the like. The general-purpose processor may be a microprocessor, or the processor may be any conventional processor or the like.

It should be further understood that the memory mentioned in embodiments of this application may be a volatile memory or a non-volatile memory, or may include a volatile memory and a non-volatile memory. The non-volatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM). For example, the RAM may be used as an external cache. As an example instead of a limitation, the RAM may include the following plurality of forms: a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

It should be noted that when the processor is a general-purpose processor, a DSP, an ASIC, an FPGA or another programmable logic device, a discrete gate or transistor logic device, or a discrete hardware component, the memory (storage module) may be integrated into the processor.

It should be further noted that the memory described in this specification is intended to include but is not limited to these memories and any memory of another proper type.

A person of ordinary skill in the art may be aware that, the units and steps in the examples described with reference to embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the protection scope of this application.

It may be clearly understood by a person skilled in the art that, for convenience and brevity of description, for a specific working process of the described system, apparatus, and unit, reference may be made to a corresponding process in the foregoing method embodiments. The details are not described herein again.

In several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings, direct couplings, or communication connections may be implemented through some interfaces. Indirect couplings or communication connections between the apparatuses or units may be implemented in an electronic form, a mechanical form, or another form.

The units described as separate components may or may not be physically separate, and parts displayed as units may or may not be physical units, may be located in one place, or may be distributed on a plurality of network units. Some or all of the units may be selected based on actual requirements to achieve the objectives of the solutions of embodiments.

In addition, functional units in embodiments of this application may be integrated into one unit, each of the units may exist alone physically, or two or more units may be integrated into one unit.

When the functions are implemented in a form of a software functional unit and sold or used as an independent product, the functions may be stored in a computer-readable storage medium. Based on such understanding, the technical solutions of this application essentially, or the part contributing to the conventional technology, or some of the technical solutions may be implemented in a form of a computer software product. The computer software product is stored in a storage medium, and includes several instructions for instructing a computer device (which may be a personal computer, a server, a network device, or the like) to perform all or some of the steps of the method described in embodiments of this application. The foregoing storage medium may include but is not limited to various media that can store program code, such as a USB flash drive, a removable hard disk, a ROM, a RAM, a magnetic disk, or an optical disc.

Unless otherwise defined, all technical and scientific terms used in this specification have same meanings as those usually understood by a person skilled in the art of this application. The terms used in this specification of this application are merely for the purpose of describing specific embodiments, and are not intended to limit this application.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for controlling dynamic change of a screen refresh rate, wherein the method is applied to an electronic device, the electronic device comprises a display screen and a display driver integrated circuit DDIC and SurfaceFlinger, and the method comprises:
    recognizing, in response to a first operation by a user, that a current scenario category changes to a first scenario category, wherein the first scenario category is a static display scenario or a dynamic display scenario;
    generating a screen refresh rate switching instruction based on a scenario recognition result, wherein the screen refresh rate switching instruction is for instructing the display screen to switch from a current first screen refresh rate to a second screen refresh rate, and the second screen refresh rate is a screen refresh rate corresponding to the first scenario category;
    sending the screen refresh rate switching instruction to the DDIC within a current frame period, to instruct the DDIC to switch to the second screen refresh rate; and
    after the DDIC is switched to the second screen refresh rate, generating, by the DDIC, a TE signal, wherein the TE signal indicates that the image sending and displaying periodicity has switched to the second Vsync periodicity;
    reporting, by the DDIC, the TE signal to the SurfaceFlinger;
    switching, by the SurfaceFlinger, the image sending and displaying periodicity from the first Vsync periodicity to the second Vsync periodicity; wherein the first Vsync periodicity corresponds to the first screen refresh rate, and the second Vsync periodicity corresponds to the second screen refresh rate.

2. The method according to claim 1, wherein the electronic device further comprises a refresh rate setting interface; and the method further comprises:
    invoking the refresh rate setting interface within the current frame period, to send the screen refresh rate switching instruction.

3. The method according to claim 2, wherein the electronic device further comprises a refresh rate decision making module; and
    the invoking the refresh rate setting interface within the current frame period, to send the screen refresh rate switching instruction to the DDIC comprises:
    invoking, by the refresh rate decision making module, the refresh rate setting interface within the current frame period, to send the screen refresh rate switching instruction to the DDIC.

4. The method according to claim 3, wherein the invoking, by the refresh rate decision making module, the refresh rate setting interface within the current frame period, to send the screen refresh rate switching instruction to the DDIC comprises:
    invoking, by the refresh rate decision making module, the refresh rate setting interface within the current frame period, to send the screen refresh rate switching instruction to a display driver; and
    sending, by the display driver, the screen refresh rate switching instruction to the DDIC.

5. The method according to claim 3, wherein the generating a screen refresh rate switching instruction based on a scenario recognition result comprises:
    generating, by the refresh rate decision making module, the screen refresh rate switching instruction based on the scenario recognition result.

6. The method according to claim 5, wherein the generating a screen refresh rate switching instruction based on a scenario recognition result comprises:
    generating the screen refresh rate switching instruction when the scenario recognition result indicates that a current scenario changes to the static display scenario, wherein the switched second screen refresh rate is lower than the current first screen refresh rate; or
    generating the screen refresh rate switching instruction when the scenario recognition result indicates that a current scenario changes to the dynamic display scenario, wherein the switched second screen refresh rate is higher than the current first screen refresh rate.

7. The method according to claim 1, wherein the method further comprises:
controlling, by the DDIC based on the screen refresh rate switching instruction, the display screen to perform refresh and display at the second screen refresh rate.

8. The method according to claim 1, wherein the switching, by the SurfaceFlinger, the image sending and displaying periodicity from the first Vsync periodicity to the second Vsync periodicity comprises:
switching, by the SurfaceFlinger, the image sending and displaying periodicity from the first Vsync periodicity to the second Vsync periodicity based on the TE signal.

9. The method according to claim 1, wherein after the switching an image sending and displaying periodicity from a first Vsync periodicity to a second Vsync periodicity, the method further comprises:
sending and displaying, by the SurfaceFlinger, an image based on the second Vsync periodicity.

10. The method according to claim 1, wherein before the generating a screen refresh rate switching instruction based on a scenario recognition result, the method further comprises:
sending and displaying, by the SurfaceFlinger, an image based on the first Vsync periodicity.

11. The method according to claim 1, wherein the electronic device further comprises a driver display and a hardware composer HWC; and
the reporting, by the DDIC, the TE signal to the SurfaceFlinger comprises:
reporting, by the DDIC, the TE signal to the driver display;
reporting, by the driver display, the TE signal to the HWC; and
reporting, by the HWC, the TE signal to the SurfaceFlinger.

12. The method according to claim 1, wherein the method further comprises:
determining the second Vsync periodicity based on the second screen refresh rate.

13. The method according to claim 12, wherein the determining the second Vsync periodicity based on the second screen refresh rate comprises:
determining the second Vsync periodicity as 1,000/R milliseconds when the second screen refresh rate is R Hz.

14. The method according to claim 13, wherein the second screen refresh rate is any one of the following: 1 Hz, 10 Hz, 30 Hz, 40 Hz, 60 Hz, 90 Hz, or 120 Hz.

15. The method according to claim 1, wherein the display screen is an organic light-emitting diode OLED display screen.

16. The method according to claim 1, wherein the display screen is an organic light-emitting diode OLED display screen.

17. An electronic device, wherein the electronic device comprises a display screen, a display driver integrated circuit DDIC and a processor coupled to a memory, and the processor is configured to execute a computer program or instructions stored in the memory, to enable the electronic device to implement a method for controlling dynamic change of a screen refresh rate, wherein the method is applied to an electronic device, the electronic device comprises a display screen and a display driver integrated circuit DDIC and SurfaceFlinger, and the method comprises:
recognizing, in response to a first operation by a user, that a current scenario category changes to a first scenario category, wherein the first scenario category is a static display scenario or a dynamic display scenario;
generating a screen refresh rate switching instruction based on a scenario recognition result, wherein the screen refresh rate switching instruction is for instructing the display screen to switch from a current first screen refresh rate to a second screen refresh rate, and the second screen refresh rate is a screen refresh rate corresponding to the first scenario category;
sending the screen refresh rate switching instruction to the DDIC within a current frame period, to instruct the DDIC to switch to the second screen refresh rate; and
after the DDIC is switched to the second screen refresh rate, generating, by the DDIC, a TE signal, wherein the TE signal indicates that the image sending and displaying periodicity has switched to the second Vsync periodicity;
reporting, by the DDIC, the TE signal to the SurfaceFlinger;
switching, by the SurfaceFlinger, the image sending and displaying periodicity from the first Vsync periodicity to the second Vsync periodicity; wherein the first Vsync periodicity corresponds to the first screen refresh rate, and the second Vsync periodicity corresponds to the second screen refresh rate.

18. A computer-readable storage medium, wherein the computer-readable storage medium stores a computer program, and when the computer program is run on an electronic device, the electronic device is enabled to perform a method for controlling dynamic change of a screen refresh rate, wherein the method is applied to an electronic device, the electronic device comprises a display screen and a display driver integrated circuit DDIC and SurfaceFlinger, and the method comprises:
recognizing, in response to a first operation by a user, that a current scenario category changes to a first scenario category, wherein the first scenario category is a static display scenario or a dynamic display scenario;
generating a screen refresh rate switching instruction based on a scenario recognition result, wherein the screen refresh rate switching instruction is for instructing the display screen to switch from a current first screen refresh rate to a second screen refresh rate, and the second screen refresh rate is a screen refresh rate corresponding to the first scenario category;
sending the screen refresh rate switching instruction to the DDIC within a current frame period, to instruct the DDIC to switch to the second screen refresh rate; and
after the DDIC is switched to the second screen refresh rate, generating, by the DDIC, a TE signal, wherein the TE signal indicates that the image sending and displaying periodicity has switched to the second Vsync periodicity;
reporting, by the DDIC, the TE signal to the SurfaceFlinger;
switching, by the SurfaceFlinger, the image sending and displaying periodicity from the first Vsync periodicity to the second Vsync periodicity; wherein the first Vsync periodicity corresponds to the first screen refresh rate, and the second Vsync periodicity corresponds to the second screen refresh rate.

* * * * *